US005931999A

United States Patent [19]

Aisner

[11] Patent Number: 5,931,999

[45] Date of Patent: Aug. 3, 1999

[54] LIQUID ART MEDIUM FOR CREATING THREE DIMENSIONAL ART

[76] Inventor: Leslie Aisner, 8 Bromfield St., Newburyport, Mass. 01950

[21] Appl. No.: 08/967,875

[22] Filed: Nov. 12, 1997

Related U.S. Application Data

[63] Continuation-in-part of application No. 08/727,018, Oct. 8, 1996, abandoned.

[51] Int. Cl.[6] ...................... C04B 14/28

[52] U.S. Cl. ...................... 106/436; 106/465; 106/779; 106/794; 106/804

[58] Field of Search ...................... 106/779, 436, 106/465, 794, 804

[56] References Cited

U.S. PATENT DOCUMENTS

| | | | |
|---|---|---|---|
| 4,076,547 | 2/1978 | Lester et al. | 106/109 |
| 4,676,196 | 6/1987 | Lojek et al. | 119/1 |
| 4,792,357 | 12/1988 | Bier | 106/600 |
| 5,207,830 | 5/1993 | Cowan | 106/672 |
| 5,378,279 | 1/1995 | Conroy | 106/720 |

*Primary Examiner*—Paul Marcantoni
*Attorney, Agent, or Firm*—Zarley, McKee, Thomte, Voorhees & Seas

[57] ABSTRACT

A raised liquid art medium comprises baking soda, corn starch, water, gesso, and chalk. The medium can be applied to a variety of surfaces for various art projects. Once applied, the medium can be manipulated while still wet and different colors of the medium can be used together without the colors running into each other or bleeding. When dry, the medium can be colored, etched, carved, or sanded to make further artistic effects.

11 Claims, No Drawings

LIQUID ART MEDIUM FOR CREATING THREE DIMENSIONAL ART

This is a continuation-in-part of application Ser. No. 08/727,018 filed on Oct. 8, 1996 now abandoned.

FIELD OF THE INVENTION

The present invention relates to an artistic medium, and in particular, a medium and method for creating three dimensional art.

BACKGROUND OF THE INVENTION

There are currently several liquid art mediums on the market, including three dimensional liquid art mediums. These three dimensional mediums are primarily comprised of an elastic or rubberized material. These materials are non-porous and therefore not accepting of other coloring agents a user may wish to apply. Further, the materials are not easily manipulated once applied due to their consistency. Thus, they are not useful for free-form drawings and designs. In addition, once dry, the prior art materials are "set" and cannot be restored or altered.

Therefore, a primary objective of the present invention is the provision of a novel liquid art medium which is useful for creating three dimensional art.

Another objective of the present invention is the provision of a raised liquid art medium which is porous and therefore receptive to the addition of other coloring agents.

Another objective of the present invention is the provision of a raised liquid art medium which can be easily manipulated when wet.

Another objective of the present invention is the provision of a raised liquid art medium which can be restored even after the medium has dried.

Yet another objective of the present invention is the provision of a raised liquid art medium which can be made in different colors, wherein the colors can be applied together without bleeding and without the colors running together.

A further objective of the present invention is the provision of a raised liquid art medium which can be used on a variety of surfaces.

Yet another objective of the present invention is the provision of a raised liquid art medium which is economical to manufacture and safe to use.

These and other objectives will be apparent from the following description of the invention.

SUMMARY OF THE INVENTION

The raised liquid art medium of the present invention is comprised of a mixture of baking soda, corn starch, water, and gesso. The medium is colored by the addition of powdered micro-fine chalk. In addition to coloring the medium, the chalk adds a thicker consistency to the medium, makes it dry faster, and also gives the medium a "puffier" appearance when dry.

The liquid art medium will bond to any surface which has some degree of rigidity. When applied, the medium will dry exactly as it applied, but can also be manipulated while wet using various artist's tools to create different designs and textures. Different colors of the wet medium may be used together without the colors running together or bleeding. Once dry, the color of the medium can be enhanced further using paint, ink, markers, chalk, crayon, etc. Moreover, the dry medium surface can also be sanded, layered, or carved to create additional artistic effects.

Unlike conventional liquid art mediums, the present invention is non-toxic, and therefore safe for use by young children. This raised liquid medium lends itself to the creation of virtually unlimited art forms.

DETAILED DESCRIPTION OF THE PREFERRED EMBODIMENT

The liquid art medium of the present invention, which has the tradename Guzali®, is comprised of baking soda, corn starch, gesso, water, and chalk. "Gesso" as used herein is defined as an acrylic or polymer based primer. It can be obtained from nearly any type of store which sells art supplies. "Acrylic" or "polymer" or both words will appear above the word "gesso" on the container label. "Gesso" as used in the present invention is contrasted from the more ancient version of gesso which was defined as a glue and chalk mixture which can still be purchased in dry powder from art stores. A preferred brand of gesso for use in the present invention is Liquitex™ Gesso, but any brand of gesso is satisfactory. Gesso is normally used by artists for coating panels, picture frames, and canvases to produce a smooth, level surface prior to painting, carving, etc. In the instant invention, gesso is used to thicken the Guzali and to impart the desired consistency.

The type of water used in the Guzali is not critical and tap water is preferred for the sake of convenience. Similarly, any type of baking soda or corn starch is appropriate for use in the present invention.

The chalk serves several purposes, including coloring the Guzali, adding a thicker consistency, increasing adherence of the Guzali to surfaces, reducing the drying time of the Guzali, and for making the Guzali "puffier" when it is dry. The chalk used should be powdered or precipitated with micro-fine particles. A preferred brand of chalk is Johnson™ Professional Marking Chalk. Johnson™ Professional Marking Chalk is a micro-fine industrial chalk which is preferred since it is non-toxic and therefore safe for small children to use. Other micro-fine powdered chalks will make a workable product, but if they are not labeled "non-toxic" they may only be appropriate for adult use.

Any color of chalk may be used in the Guzali and a broad range of colors can be created depending on the amount of chalk added to the base mixture, i.e. from pastels to rich deep color tones. Also, different colors of chalk can be mixed together to create different color combinations. For example, yellow and blue chalk can be mixed together to form different shades of green.

The base mixture is already white prior to the addition of the chalk. However, chalk should still be added even if the user wants a white Guzali since the chalk also imparts the other desired characteristics to the Guzali, including the proper consistency, drying time, puffiness, and increased adherability to surfaces.

In the Guzali, the baking soda can be present in an amount of from about 30–50% v/v, the corn starch from about 15–30% v/v, the gesso from about 15–30% w/v, the water from about 7–12% v/v, and the chalk from about 3–15% v/v. The preferred ratio of baking soda, corn starch, gesso, and water is about 2:1:1:1, respectively. Depending upon the type of art project the user is making, more or less water should be added, i.e. the addition of more water makes a thinner Guzali.

By using a high percentage of the dry ingredients, a more structured formulation can also be made which can be used for molding. As much as 4 oz. of chalk may be added to one cup of the remaining ingredients to produce a thick, pliable and moldable dough-like mixture. This mixture may be rolled into beads or flattened and allowed to dry. The hard finished product is a sculpted entity that stands on its own without adhering to the surface. This product can be further etched, drawn on, or painted and is breakable. It should be finished with a varnish or medium to add durability.

If a higher percentage of chalk is added to the Guzali, a higher percentage of water should also be used to maintain the desired consistency. Generally, if darker colors of chalk are used, a higher percentage of chalk should be added.

The inventor has experimented with various other coloring agents to add to the base mixture, but has found that chalk is the only agent which imparts the desired color, consistency, etc. to the Guzali. The other agents attempted, including paint, generally caused the Guzali to not "puff up" as well and caused the dried Guzali to bubble and form lines on the surface. It is possible that an acrylic artist color and an acrylic polymer emulsion with pigment, such as those made by Liquitex™, could be substituted for gesso and colored chalk powder to form a comparable Guzali. Colored chalk could be added if necessary to enhance the colors along with additional water to keep the desired consistency.

One coloring agent tried by the inventor was a powder pigment made by Crayola® which is normally mixed with water to create tempra paints. When the powder pigment was used instead of chalk, the product did not have the adhesive qualities of Guzali but instead was easily peeled off the surface to which it was applied. In addition, the powder pigment had other drawbacks, including the fact that the powder stains clothing, tends to "waft up" when opened such that it is easily inhaled, and has a pungent odor, all in contrast to the chalk powder used in Guzali.

The surface texture of the Guzali can be changed by the addition of materials, including sand, glitter, and other miscible ingredients. The addition of fume silica or silica gel will impart roughness to the surface of the Guzali. It is also contemplated that various other ingredients can be added to the Guzali to enhance its elegance, such as brightening agents, glossing agents, fragrance, etc.

In making the Guzali, the baking soda, corn starch, water, and gesso are preferably combined to form a liquid base prior to adding the chalk. These ingredients should be mixed until the base is smooth and without lumps. A preferred method for making the base is to first mix the ingredients by hand, then in an electric mixture for an amount of time sufficient such that the liquid base is smooth and without lumps. The chalk and any necessary extra water are then added to the base and mixed in until the liquid medium is free of lumps. Once the liquid is free of lumps, it is ready to use.

Guzali may be applied to a variety of different surfaces, the only requirement being that the surface is semi-rigid to rigid. The surface is also preferably flat. Examples of appropriate surfaces for application of Guzali include but are not limited to canvas, mat board, tag board, Plexiglas, masonite, and foam core. Guzali will also adhere to fabric and certain types of more rigid paper, such as construction paper. If the fabric is to worn as clothing, it should be treated with water repellant prior to applying the Guzali.

Guzali can be applied in any manner, but is best applied using a means for directing it to particular areas. The preferred method is with a nozzle attachment of some type, such as that found on a ketchup bottle. By changing the opening size of the nozzle, the Guzali can be applied in thick, fat lines to very thin, precise lines. Drying time will vary accordingly.

Guzali can be layered to create thicker designs. This is done by applying a first layer which is allowed to dry and then applying a subsequent layer. This procedure can be repeated multiple times until the desired thickness is achieved. This layering technique is good for carving projects and can be done quickly if dried in an oven between layers.

Different colors of Guzali can be applied simultaneously without the colors running together and without bleeding. This also allows for the creation of "swirled" designs. When applied, Guzali will puddle on the surface exactly where it is placed and the user may leave it as is or can manipulate the Guzali while wet using various artist's tools, including brushes or knifes to create different designs and textures. If spread out while wet, Guzali will have texture and will dry rough. Wet Guzali can also be dented or cut for further effects. The Guzali can be easily washed from the surface to which it is applied within 10–15 minutes after applied and washes off hands, clothes, and floors while it is still wet.

Guzali has excellent adhesive qualities and will not peel off. Guzali has some flexibility and, once dry, takes effort to break it up, crack, or peel off the surface which it has been applied to. If the Guzali does happen to crack, it may be fixed by rubbing water lightly over the area until it becomes tacky and reworking the spot.

Upon drying, Guzali maintains the same surface smoothness as it had while wet without contracting or sinking into itself, unlike conventional three dimensional liquid mediums. Air drying time for Guzali will range from about 3–4 hours, depending on a number of factors including humidity, heat, the amount of water used in the Guzali, and how thickly the Guzali is applied. Guzali may also be dried quickly by placing it in a preheated warm oven (about 150° F.) for about 10–15 minutes depending on the thickness of the Guzali. Upon cooling, the surface will be hard and ready to paint or carve.

Once the Guzali is dry, the color of the surface may be enhanced with other coloring agents which can be applied directly to the surface without cracking or indenting the surface of the Guzali. For example, the surface can be colored on with crayons, magic markers, ink pens, acrylic and/or oil paint, tempra, or chalk without affecting the shape of the Guzali surface. Again, the colors placed on the surface of the dried medium will not bleed or run together but instead forms clean lines, thus allowing for free-form drawings.

Furthermore, the shape of the dry surface of the Guzali can be changed by sanding, etching or carving. Areas of the Guzali can be reworked while carving etc. by wetting the material and adding new Guzali. Moreover, dry Guzali can be cut with scissors when adhered to paper, mat, or tag board without cracking so long as the Guzali is in a thin layer.

Once the Guzali has dried and colored or manipulated as desired, a thin coat of protective agent is preferably applied to protect the medium from environmental factors, including dust, dirt fingerprints, and moisture. Such agents are conventionally known in the art and include varnish, matte or gloss mediums.

Guzali may be stored at room temperature or stored in a plastic container or jar in the refrigerator to extend its shelf life. If the latter method of storing is chose, it may be necessary to stir the mixture periodically to prevent hardening. Steel ball bearings may be incorporated into stored Guzali to extend its shelf life. The Guzali can also be "revitalized" by adding water and then mixing thoroughly. To revitalize colored Guzali that has been sitting for some time and has thickened, either water and/or basic white Guzali can be added.

Guzali can be used in a variety of artistic projects. For example, Guzali is an excellent medium for creating jewelry. Earrings are made by taking heavy string or leather and dipping them into the Guzali batter. The Guzali is allowed time to drip and dry and the earrings are then colored or finished with a variety of art products. The earrings should be sealed with polymer medium. The earrings remain slightly flexible and lightweight. Other jewelry items such as beads may be coated in Guzali, decorated, polymer coated, and used for necklaces, bracelets, etc.

For frames, Guzali can be used as an edging on wood, mat board, Plexiglas. It can also be used to restore frames by filling in gaps or restoring broken pieces. On a larger scale, it can be used in architecture in models and landscapes. The Guzali mixture may be thickened by adding chalk or using less water to create a fine filler that, when dry, may be sanded, filed, scraped, or cut and varnished and/or painted.

Guzali also works well for lettering signs. Signs made with Guzali graphic lettering may be small or large, thick-lined or thin, with or without color and/or combinations of colors to create an attractive and fun way to do logos or signs. In this respect, Guzali is best suited to wood, like masonite, tag or poster board, mat board, plastic board, or Plexiglas and other more rigid surfaces. Signs to be displayed outside must have a finishing, protective coat of varnish or medium covering the Guzali.

For tile, grout-like Guzali may be used for adhering tile pieces for patterns and designs on hard surfaces for various craft projects. For carvings, a thinner mixture can be poured onto rigid surfaces (i.e. masonite or other such hard surface material) in thin layers until the desired thickness or deepness is reached. It can then be carved, sanded, shaved into scenes, faces, etc.

The following examples are provided to aid in the understanding of the present invention. They are not intended to limit the invention in any manner.

EXAMPLE 1

Preparation of Picture Sculpt™ or Etched Guzali®

| | |
|---|---|
| Formulation: | 2 cups baking soda |
| | 1 cup corn starch |
| | 1 cup Liquitex ™ Gesso |
| | 1 cup tap water |
| | 4–7 tablespoonsful micro-fine chalk |
| | (more water may need to be added depending upon the amount of chalk added) |

The above mixture creates a harder surface suitable for etching. This mixture, when poured, will find its own level and is one-dimensional until carved. It should be poured liberally onto a flat, hard surface, such as canvas board, masonite, or Plexiglas, and will spread to the edges from the center out. The spreading may be helped with an artist's tool, such as an art knife. A plastic bottle with large nozzle opening can also be used, moving the flowing liquid all over the surface until covered evenly. Drying time will vary according to humidity.

When completely dry and hardened, a thin layer of gesso or latex paint should be applied. The surface is then ready for etching with wood carving tools, dentist's implements, or other sharp-edged tools. The surface may also be sanded, shaved, cut, or drilled.

EXAMPLE 2

| | |
|---|---|
| Basic Formulation: | 2 cups baking soda |
| | 1 cup corn starch |
| | 1 cup gesso |

For white Guzali: add ¼ to ¾ cup white marking chalk powder and from ⅔ to ¾ cup water.

For colored Guzali: add ¼ to 1 cup colored marking chalk powder and from ⅔ to 1 cup water or more if necessary to maintain a smooth and flowing consistency.

For adding to color to premixed Guzali: to one cup premixed Guzali (baking soda, corn starch, gesso, and water), add up to ½ cup colored chalk and up to ½ cup water depending on the amount of chalk added for coloration (additional water should be added in small increments to gain a true consistency and flowing mixture.

The above mixture forms a thicker and puffier Guzali which is ideal for the application of other coloring agents once it is dry.

As shown above, Guzali presents an improvement over conventional mediums for the following reasons: 1) it is hard; 2) it accepts various coloring when dry; 3) is flexible; 4) can be carved; 5) flows and puddles without ridges or lines; 6) can be used as a paint to cover or fill in areas with texture; and 7) can be restored or reworked. It is also more economical to make than conventional mediums since its ingredients are relatively much less expensive than those present in prior art mediums.

The invention has been shown and described above in connection with the preferred embodiments, and it is understood that many modifications, substitutions, and additions may be made which are within the intended broad scope of the invention. From the foregoing, it can be seen that the present invention accomplishes at least all of the stated objectives.

What is claimed is:

1. A raised liquid art medium comprising:

from about 30–50% by volume baking soda;

from about 15–30% by volume corn starch;

from about 15–30% by volume gesso, said gesso comprising an acrylic polymer, calcium carbonate, and a pigment selected from the group consisting of lithopone, titanium dioxide, or a combination thereof; from about 7–12% by volume water; and from about 3–15% by volume chalk.

2. A raised liquid art medium according to claim 1 wherein the chalk is micro-fine powdered or precipitated chalk.

3. A raised liquid art medium according to claim 1 wherein the ratio of baking soda, corn starch, gesso, and water is about 2:1:1:1, respectively.

4. A raised liquid art medium according to claim 1 wherein the medium is non-toxic.

5. A raised liquid art medium according to claim 1 wherein the chalk is colored.

6. A raised liquid art medium according to claim 1 further comprising a texturizing agent selected from the group consisting of sand, glitter, fume silica, and silica gel.

7. A method of making a raised liquid art medium comprising: combining from about 30–50% by volume baking soda, from about 15–30% by volume corn starch, from about 7–12% by volume water, from about 3–15% by volume chalk, and from about 15–30% by volume gesso, said gesso comprising an acrylic polymer, calcium carbonate, and a pigment selected from the group consisting of lithopone, titanium dioxide, or a combination thereof, to form a substantially lump-free medium.

8. A method according to claim 7 wherein the ratio of the baking soda, corn starch, gesso, and water is about 2:1:1:1, respectively.

9. A method according to claim 7 wherein the baking soda, corn starch, water, and gesso are combined prior to adding the chalk to form a liquid base.

10. A method according to claim 9 wherein the liquid base and the chalk are combined first by hand and then with an electric mixer.

11. A raised liquid art medium comprising:

sodium bicarbonate;

corn starch;

gesso, said gesso comprising an acrylic polymer, calcium carbonate, and a pigment selected from the group consisting of titanium dioxide, lithopone, or a combination thereof;

water; and chalk;

wherein the ratio of sodium bicarbonate, corn starch, gesso, and water is about 2:1:1:1, respectively.

* * * * *